United States Patent [19]

Hansen et al.

[11] Patent Number: 4,653,280

[45] Date of Patent: Mar. 31, 1987

[54] DIAGNOSTIC SYSTEM FOR DETECTING FAULTY SENSORS IN A REFRIGERATION SYSTEM

[76] Inventors: John C. Hansen, R.D. 1, Stauffer Rd., Spring Grove, Pa. 17362; Harold B. Ginder, 835 Clare La., York, Pa. 17402; Lloyd A. Johnson, P.O. Box 159, Liverpool, N.Y. 13088

[21] Appl. No.: 777,384

[22] Filed: Sep. 18, 1985

[51] Int. Cl.[4] .............................................. F25B 49/00
[52] U.S. Cl. ........................................ 62/127; 62/158
[58] Field of Search ................. 62/126, 127, 201, 158; 364/551, 557, 558, 185, 187

[56] References Cited

U.S. PATENT DOCUMENTS

| | | | |
|---|---|---|---|
| 4,122,720 | 10/1978 | Podl | 60/277 X |
| 4,249,238 | 2/1981 | Spang, III et al. | 364/431.02 |
| 4,282,719 | 8/1981 | Kountz et al. | 62/115 |
| 4,325,223 | 4/1982 | Cantley | 62/126 |
| 4,337,516 | 6/1982 | Murphy et al. | 364/571 X |
| 4,381,549 | 4/1983 | Stamp et al. | 364/557 |
| 4,432,210 | 2/1984 | Saito | 364/557 X |
| 4,535,598 | 8/1985 | Mount | 62/126 |

Primary Examiner—Harry Tanner

[57] ABSTRACT

When sensors are employed to monitor different operating variables or parameters in a refrigeration system, the sensor outputs will normally have predetermined known relationships with respect to each other as long as the sensors are functioning properly and regardless of the operating condition of the refrigeration system. By comparing the output of one sensor relative to that of another sensor, a faulty condition of either of those two sensors may be detected. For example, during stabilized system operation the output of a condenser pressure sensor should always indicate a higher pressure than that reflected by the output of an evaporator pressure sensor. By effectively subtracting the evaporator pressure from the condenser pressure, a faulty sensor may be discovered. If the result of the subtraction is zero or negative, at least one of the pressure sensors is defective. When a faulty sensor is detected, a warning message is displayed to operating personnel.

7 Claims, 4 Drawing Figures

DIAGNOSTIC SYSTEM FOR DETECTING FAULTY SENSORS IN A REFRIGERATION SYSTEM

BACKGROUND OF THE INVENTION

This invention relates to a diagnostic system for effectively testing the operation of sensors in a refrigeration system and for providing a warning when at least one of the sensors is found to be defective.

In refrigeration systems, and particularly in large commercial and industrial air conditioning systems, several of the operating variables or parameters are monitored for control and safety reasons. For example, the pressure of the refrigerant in the condenser and in the evaporator, the temperature of the refrigerant at the compressor discharge, the oil temperature, and the motor current may all be sensed by separate sensors. The sensor outputs may be used to control the operation of the air conditioning system and also to detect when dangerous faults exist, such as when the condenser refrigerant pressure reaches a preset maximum allowable level.

Unfortunately, in the past there was no way to check the individual sensors to confirm that they were functioning properly. The failure of a sensor could go undetected or cause undesirable system operation without generating a system fault. If a sensor malfunctions there is no way of discovering this in the prior refrigeration systems.

This shortcoming has now been overcome by the present invention. By means of a relatively inexpensive arrangement, faulty sensors are automatically detected and a fault warning message is displayed when a defective sensor is present.

SUMMARY OF THE INVENTION

The diagnostic system of the invention is incorporated in a refrigeration system having a refrigeration circuit, including a condenser and an evaporator, through which refrigerant flows and having first and second operating variables which are sensed by first and second sensors, respectively, the variables having a predetermined relationship with respect to each other as a result of which the sensor outputs also have a predetermined relationship with respect to each other when the sensors are functioning properly. The diagnostic system, which detects when either one of the sensors is faulty, comprises means for developing, from the output of the first sensor, a first signal representing the first variable, and means for developing, from the output of the second sensor, a second signal representing the second variable. There are computing means for determining, from the first and second signals, if an impossible relationship exists between the sensor outputs and thus between the first and second variables, thereby indicating that the output of at least one of the sensors is in error and that the sensor is therefore faulty. Warning means, controlled by the computing means, provides a warning message to operating personnel when a faulty sensor is detected.

In accordance with a more detailed aspect of the invention, the first sensor senses the pressure of the refrigerant in the condenser so that the first signal represents the condenser pressure and the second sensor senses the pressure of the refrigerant in the evaporator so that the second signal represents the evaporator pressure. The computing means effectively subtracts the evaporator pressure from the condenser pressure and if the answer is equal or negative with respect to zero, which is impossible under any operating condition of the refrigeration system, the warning means is actuated by the computing means in order to produce a warning message that a faulty sensor is found.

DESCRIPTION OF THE DRAWINGS

The features of the invention which are believed to be novel are set forth with particularity in the appended claims. The invention may best be understood, however, by reference to the following description in conjunction with the accompanying drawings in which:

DESCRIPTION OF THE ILLUSTRATED EMBODIMENT

Figure 1:
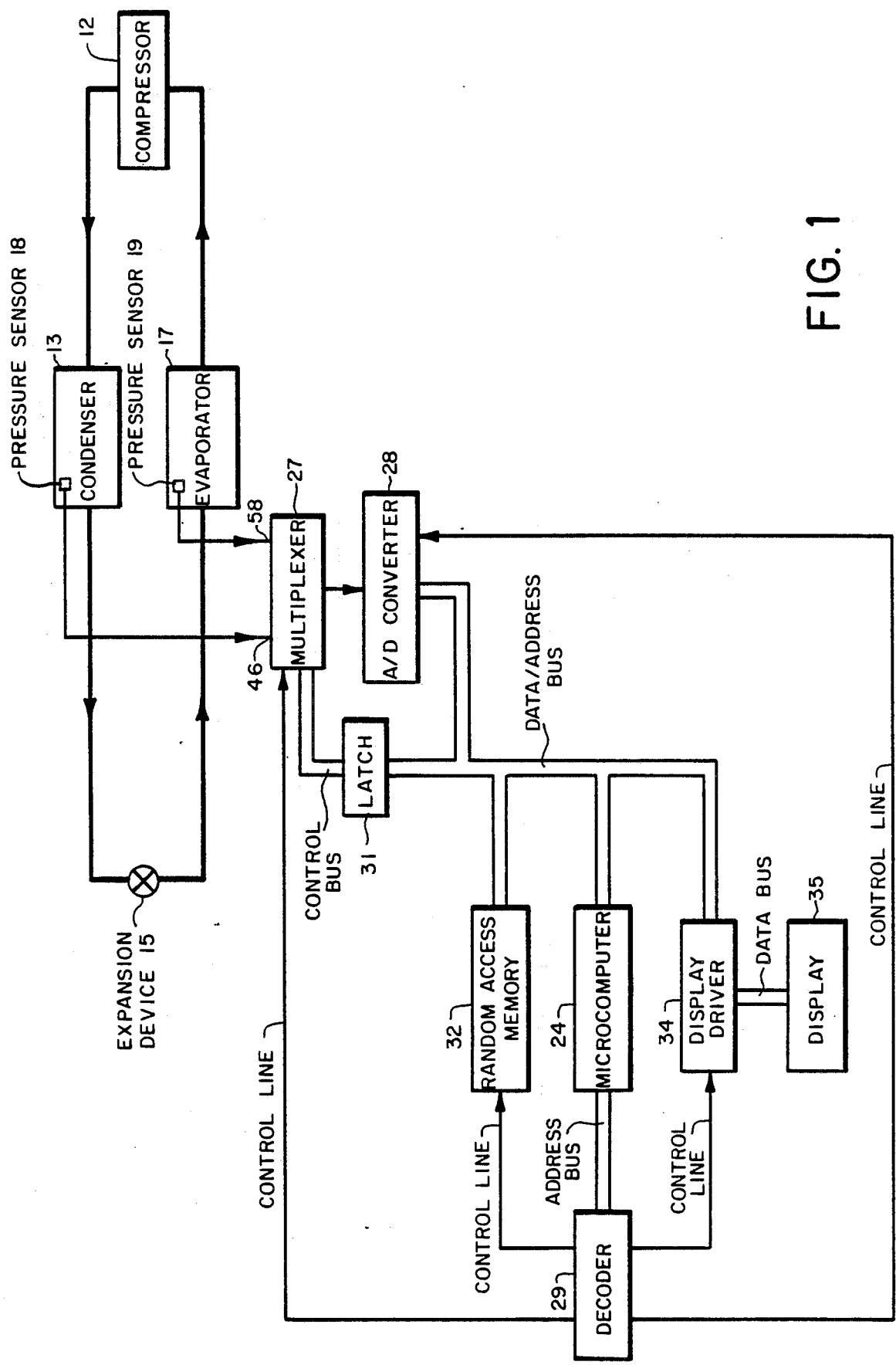
FIG. 1 is a block diagram illustrating a refrigeration system, specifically an air conditioning system, having a diagnostic system constructed in accordance with one embodiment of the invention; and, FIGS. 2a, 2b and 2c show a flow chart illustrating the logic sequence of operations and decisions which occur in operating the diagnostic system.

It will be assumed that the air conditioning system disclosed in FIG. 1 is a large commercial or industrial system which typically employs a centrifugal liquid chiller. Compressor 12, which would be of the centrifugal type, discharges compressed refrigerant which flows through condenser 13 where it condenses and cools by transferring heat to water which circulates between a cooling tower (not shown) and the condenser. From the condenser 13 the refrigerant passes through the expansion device 15 and then through the evaporator 17 to the inlet of the centrifugal compressor. Liquid (usually water) is received from the building (or other cooling load) and flows through a heat exchange coil (not shown) in the evaporator 17, after which the liquid exits for return to the building which may be remotely located from the evaporator. The liquid or water is chilled as it flows through the coil in evaporator 17, transferring heat to the refrigerant. After leaving the evaporator, the chilled water is employed to cool the building in any well-known manner. For example, air handlers or fan coil units may be used in which fans blow room air over coils through which the chilled water flows. The inlet of compressor 12 usually comprises adjustable guide vanes or prerotation vanes (PRV) to regulate the quantity of refrigerant flowing through the compressor. The capacity of the compressor is adjusted by varying the position of the prerotation vanes. Customarily, the temperature of the chilled water leaving the evaporator 17 is sensed and control apparatus (not shown), which operates in response to that sensed temperature, controls the prerotation vanes to regulate the capacity of the compressor 12 as necessary to maintain the leaving chilled water at a desired temperature setpoint. The control system for the compressor has not been shown in order to avoid unduly encumbering the application.

In addition to the sensor for the leaving chilled water temperature, there are other sensors in the refrigeration system for monitoring and controlling different operating variables or parameters. Some of these variables may be sensed for safety reasons and appropriate steps may be taken when those variables fall outside of their desired limits. Two of the sensors are illustrated in FIG. 1, namely, pressure sensor 18 which senses the pressure of the refrigerant in the condenser 13 and produces an analog voltage representing the condenser pressure, and pressure sensor 19 which monitors the refrigerant pressure in the evaporator 17 and outputs an analog voltage representing the evaporator pressure. The circuitry which is conventionally connected to sensors 18 and 19 to utilize the sensed data has not been shown in FIG. 1 since such circuitry is not part of the invention. The various sensor outputs normally have predetermined known relationships relative to each other when the sensors are functioning properly, and this occurs regardless of the operating condition of the refrigeration system. By employing the known relationships, a comparison of the outputs of different pairs of sensors will reveal whether the sensors are faulty. In the disclosed embodiment, the faulty condition of only pressure sensors 18 and 19 is determined, but it will be appreciated that the other sensors (not shown) used in the refrigeration system may also be checked as to their proper operation by comparing sensor outputs.

In short, microcomputer-based apparatus, which operates in response to the outputs of sensors 18 and 19, determines whether the predetermined known relationship, or an impossible relationship, exists between those outputs. Finding an impossible state means that at least one of sensors 18 and 19 is defective and an appropriate warning message is visually displayed to operating personnel to facilitate repair or replacement of the malfunctioning sensor. This is implemented primarily by microcomputer 24 which may be of the type manufactured by Intel and designated by the number 8051. That particular microcomputer includes a ROM (read only memory) sufficient to permanently store the required program. All of the circuits controlled by the microcomputer 24 are also of conventional construction and are commercially available. Multiplexer 27 is an integrated circuit chip and has the capability of simultaneously receiving analog voltage signals over several different input channels and outputting these signals one at a time to analog-to-digital converter 28 under the control of decoder 29 and latch 31, which in turn are controlled by microcomputer 24. While multiplexer 27 is capable of handling a much larger number of inputs than the two needed to implement the disclosed embodiment of the invention, such a multiplexer would be needed to facilitate the monitoring and control of other parameters in the air conditioning system. RAM (random access memory) 32 is employed to store pressure information until it is needed. Display driver 34 when energized functions as a buffer and transmits data from the ROM in the microcomputer 24 to display 35 to provide a message to operating personnel.

Although all of the necessary circuitry has not been illustrated in FIG. 1 to avoid unduly encumbering the drawing, microcomputer 24 may easily be programmed to control and monitor different functions and operating characteristics of the refrigeration system. For example, the microcomputer may be programmed to control the compressor capacity to hold the leaving chilled water at a desired temperature setpoint. As the microcomputer is sequenced through its program, information representing the actual temperature of the leaving chilled water will be effectively compared with the desired setpoint information and from the comparison an appropriate control signal will be developed to adjust the prerotation vanes to the setting required to maintain the temperature of the leaving chilled water relatively constant and at the desired setpoint.

Figure 2A:
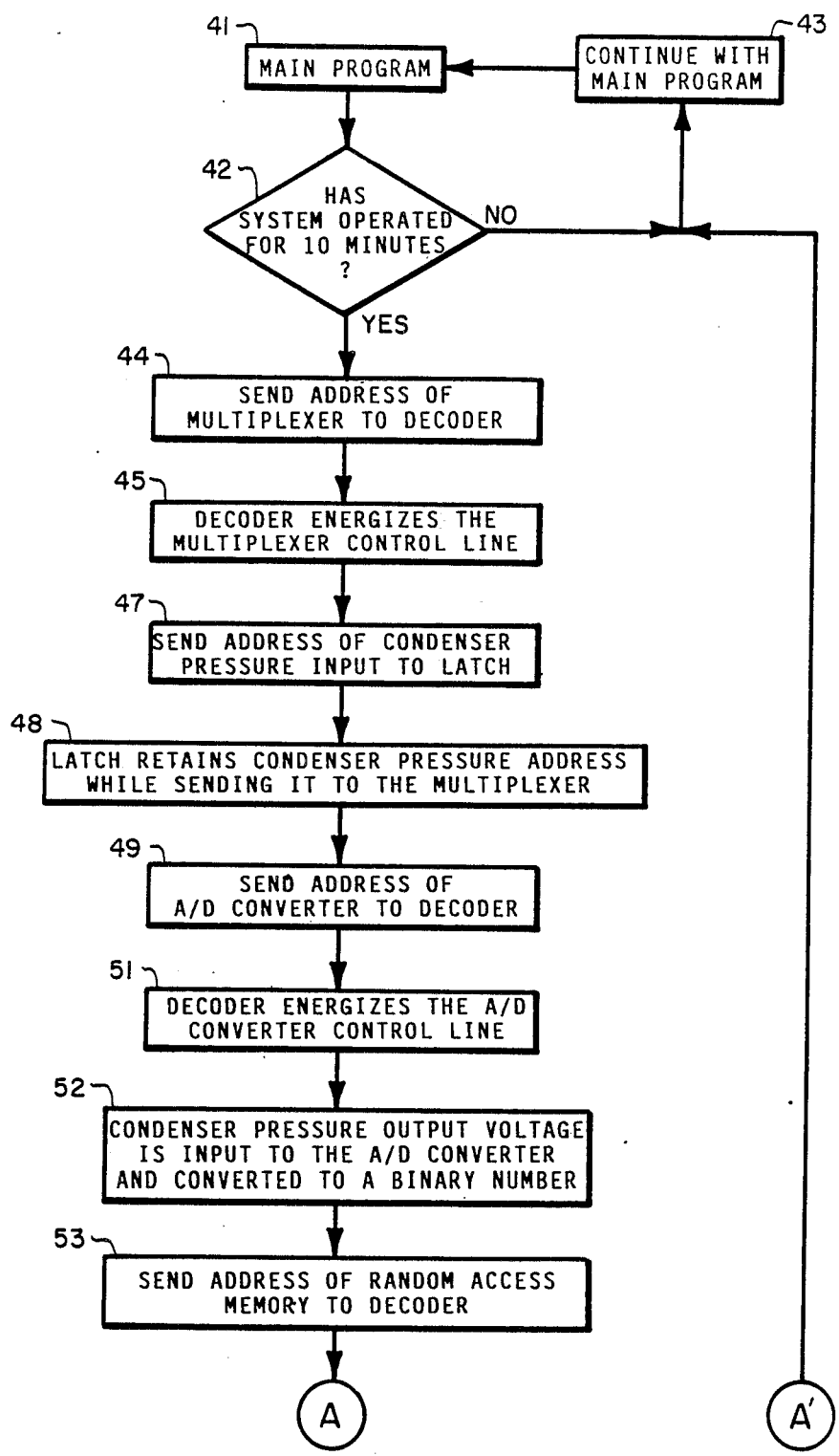
Figure 2B:
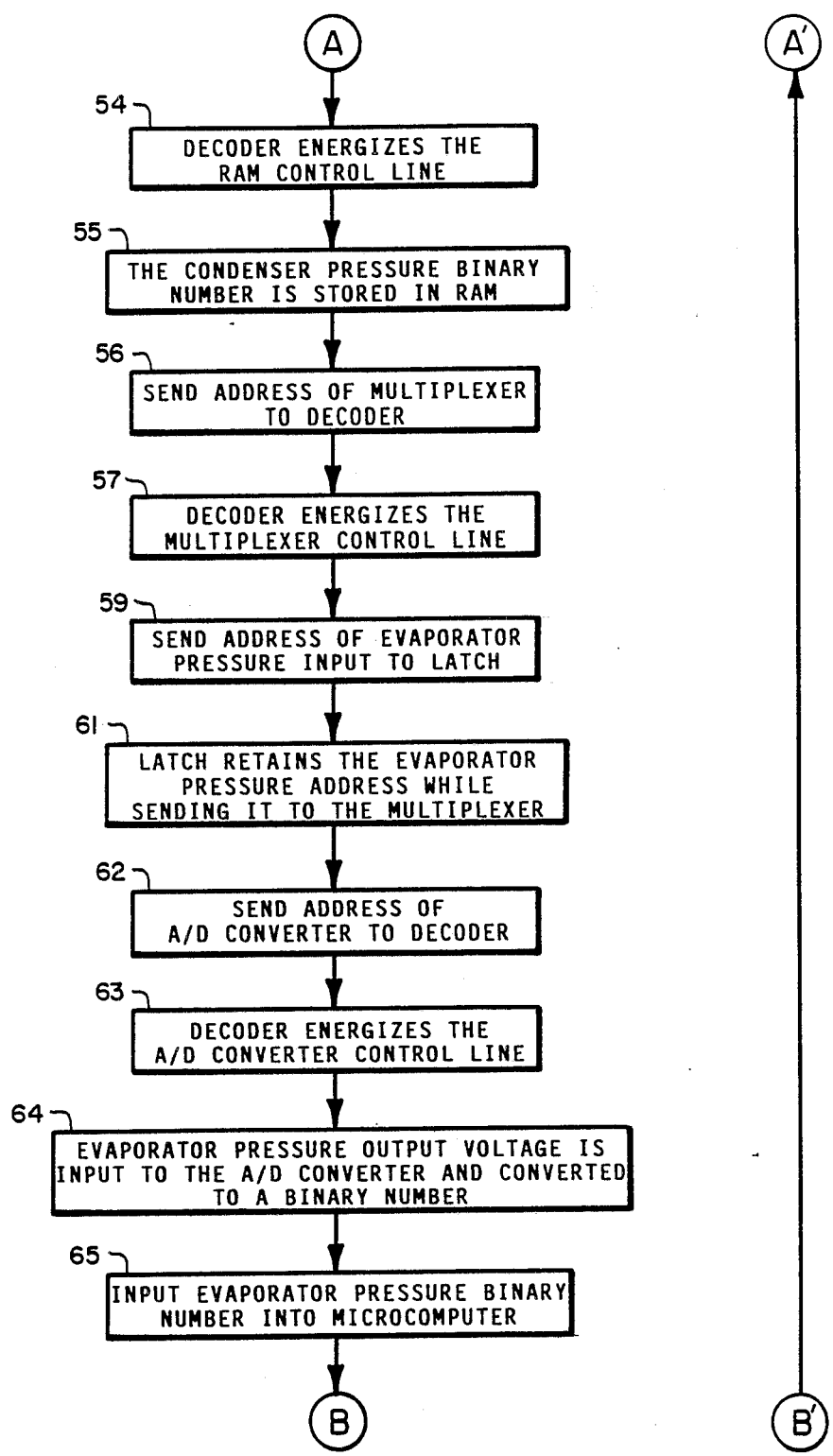
Figure 2C:
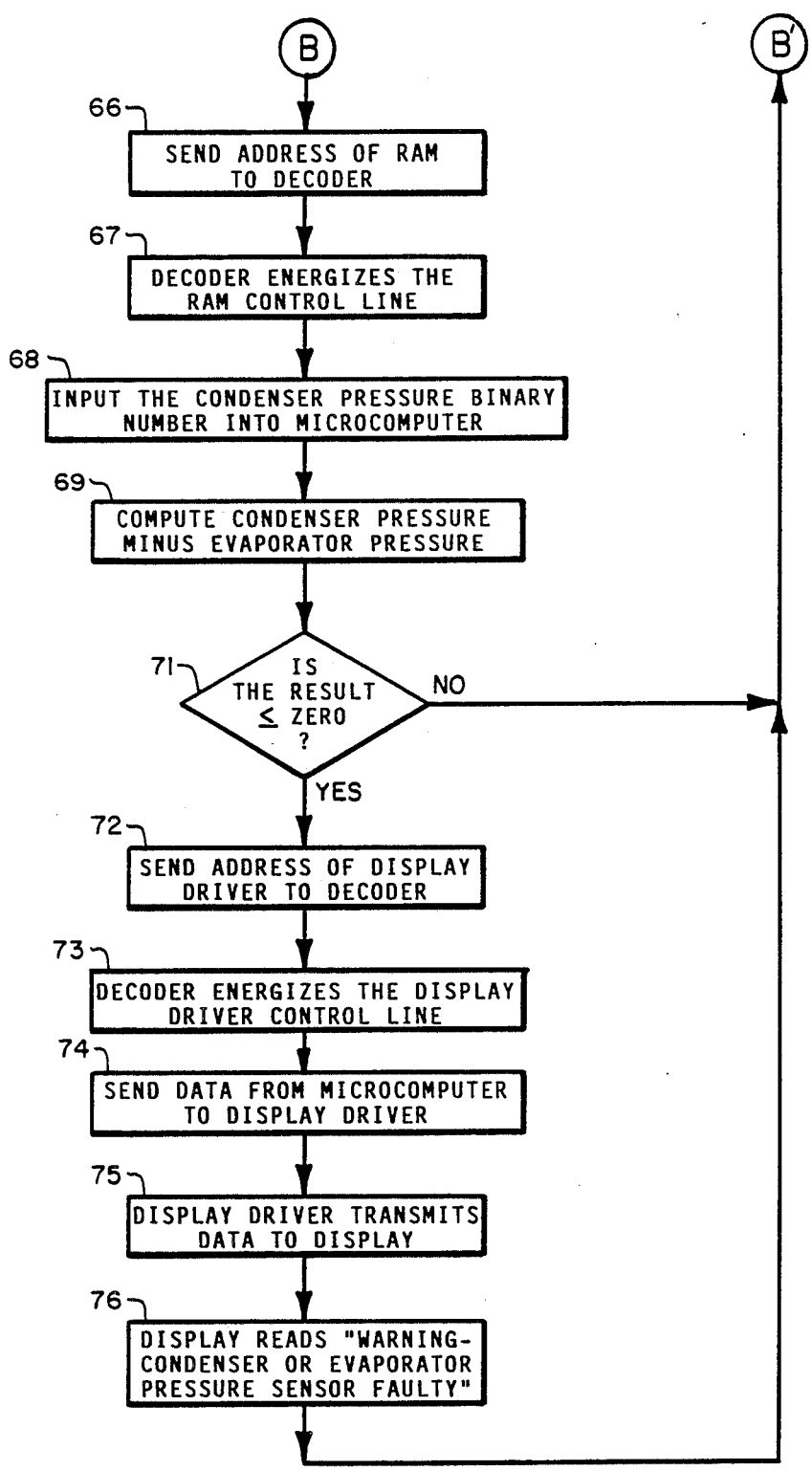

The operation of the invention may be more fully understood with the aid of the flow chart of FIGS. 2a, 2b and 2c which depicts the portion of the microcomputer's program dealing with the process for detecting if sensors 18 and 19 are faulty. Specifically, this program portion is a subroutine of the main program. Since the computing system is capable of monitoring and controlling several parameters in the refrigeration system, when all of the contemplated functions are included the complete program for microcomputer 24 will be substantially greater than that illustrated in FIGS. 2a, 2b and 2c. From the main program (block 41), decision block 42 determines whether the refrigeration system has powered up and has been operating for at least ten minutes. This preset time period is necessary to allow the condenser and evaporator pressures to stabilize. If the system has not been running for ten minutes the subroutine is bypassed and the main program is continued as indicated by block 43.

After ten minutes of system operation, microcomputer 24 transmits to decoder 29 (via the address bus) the address of multiplexer 27 (see operation block 44), whereupon the decoder energizes the control line to the multiplexer (block 45) to activate the multiplexer. The address of the condenser pressure input 46 to the multiplexer is then forwarded from microcomputer 24 and over the data/address bus to latch 31, as indicated by operation block 47, the latch retaining that address while at the same time transmitting it over the control bus to the multiplexer so that the analog voltage signal, appearing at input 46 and representing the condenser pressure, will be channeled to the output of the multiplexer, see block 48. Hence, while the condenser pressure input address sent to latch 31 appears only momentarily, the address will be held by the latch so that the condenser pressure signal at input 46 will continue to be fed to the multiplexer output as long as the control line from the decoder remains energized.

Next, as shown by block 49, the address of the A/D converter 28 is forwarded to decoder 29 which then (block 51) supplies an energizing signal over the control line to converter 28. Since latch 31 will be holding the condenser pressure input address, the condenser pressure output voltage from sensor 18 will be fed through the multiplexer to the input of the A/D converter and converted to a binary number (block 52) representing the condenser pressure. The program then steps to block 53, in accordance with which the address of RAM 32 is transmitted to decoder 29, which thereupon energizes the control line to the RAM (block 54) in order that the condenser pressure binary number may be stored (block 55) in the RAM for later use.

As indicated by block 56 in the flow chart, the address of the multiplexer is again sent to decoder 29 to effect energization by the decoder of the control line to the multiplexer (block 57). The address of the evaporator pressure input 58 is then transmitted from microcomputer 24 to latch 31 (block 59), which retains the address while sending it to the multiplexer (block 61). Next (block 62), the address of the A/D converter is forwarded to the decoder, in response to which the decoder energizes the control line to the converter (block 63) so that the evaporator pressure output voltage from sensor 19 will be input to the converter and converted to a binary number (block 64) representing the evaporator pressure. The evaporator pressure binary number is then inputted to the microcomputer (block 65), after which the microcomputer feeds the address of the RAM to the decoder (block 66) to effect energization of the control line to the RAM (block 67) so that the condenser pressure binary number may be supplied to the microcomputer (block 68).

The step indicated by block 69 in the program is then executed to subtract the evaporator pressure from the condenser pressure. This is a binary subtraction of the two numbers representing the two pressures. If the result of the subtraction is less than or equal to zero, the YES exit of decision block 71 will be followed, whereas if the result is greater than zero the NO exit will be taken. Under any operating condition the evaporator pressure will never be greater than the condenser pressure. Hence, under normal conditions with properly functioning sensors 18 and 19, a NO answer will be determined by block 71 and the subroutine will be terminated and the main program will be continued (block 43). In short, when sensors 18 and 19 are operating correctly, their outputs will have a predetermined known relationship (namely, the output of sensor 18 will be greater than that of sensor 19) and the computing circuitry will check to make certain that the predetermined relationship exists. When that condition is found, a return to the main program will be made.

On the other hand, in the event that one of the sensors 18,19 is malfunctioning or defective, a YES answer will be determined by decision block 71 which effectively shows that an impossible relationship exists between the outputs of sensors 18 and 19 and thus between the condenser and evaporator pressures, thereby indicating that the output of at least one of the sensors is in error and that the sensor is therefore faulty. Operation block 72 will thus be entered in accordance with which the address of the display driver 34 is transmitted to the decoder from microcomputer 24 to generate an energizing signal on the control line to the display driver (block 73). With the display driver activated, display data (stored in the ROM in the microcomputer) will be sent to the display driver (block 74) via the data/address bus and then on to the display 35 over the data bus (block 75). As shown by block 76, the display data produces on display 35 the visible warning message "Warning-condenser or evaporator pressure sensor faulty". Upon viewing this warning information, operating personnel may easily identify and replace the particular sensor which is faulty. After the step is executed shown by operation block 76, the main program will be continued as indicated by block 43.

While it is not necessary to automatically shut the refrigeration system down when a faulty sensor is discovered, since merely a warning message is needed, the diagnostic system could be modified and programmed to turn the compressor off (such as by removing the electrical power supplied to the compressor motor) in response to the detection of a defective sensor.

It will also be appreciated that while the illustrated diagnostic system is microcomputer based, the invention could be implemented instead with other integrated circuits or even with discrete circuit components.

While a particular embodiment of the invention has been shown and described, modifications may be made, and it is intended in the appended claims to cover all such modifications as may fall within the true spirit and scope of the invention.

We claim:

1. In a refrigeration system having a refrigeration circuit, including a condenser and an evaporator, through which refrigerant flows and having first and second operating variables which are sensed by first and second sensors, respectively, the variables having a predetermined relationship with respect to each other as a result of which the sensor outputs also have a predetermined relationship with respect to each other when the sensors are functioning properly, a diagnostic system for detecting when either one of the sensors is faulty, comprising:

means for developing, from the output of the first sensor, a first signal representing the first variable;

means for developing, from the output of the second sensor, a second signal representing the second variable;

computing means for determining, from the difference between said first and second signals, if an impossible relationship exists between the sensor outputs and thus between the first and second variables, thereby indicating that the output of at least one of the sensors is in error and that the sensor is therefore faulty;

and warning means, controlled by said computing means, for providing a warning message to operating personnel when a faulty sensor is detected.

2. A diagnostic system according to claim 1 wherein the sensed operating variables are different characteristics of the refrigerant flowing through the refrigeration circuit.

3. A diagnostic system according to claim 1 wherein operation of said computing means is delayed for a preset time period following power up of the refrigeration system to allow the first and second operating variables to stabilize.

4. A diagnostic system according to claim 1 wherein said warning means provides a visual display when a faulty sensor is discovered.

5. A diagnostic system according to claim 1 wherein said computing means includes a microcomputer.

6. A diagnostic system according to claim 1 wherein the first sensor senses the pressure of the refrigerant in the condenser so that said first signal represents the condenser pressure and the second sensor senses the pressure of the refrigerant in the evaporator so that said second signal represents the evaporator pressure.

7. A diagnostic system according to claim 6 wherein said computing means effectively subtracts the evaporator pressure from the condenser pressure and if the answer is equal, or negative with respect, to zero, which is impossible under any operating condition of the refrigeration system, said warning means is actuated by the computing means in order to produce a warning message that a faulty sensor is found.

* * * * *